United States Patent
Pahud

(10) Patent No.: US 7,552,815 B2
(45) Date of Patent: Jun. 30, 2009

(54) METHOD FOR PIVOTING PLATE ELEMENTS AND DEVICE FOR APPLYING SAID METHOD

(75) Inventor: Marc Pahud, Cheseaux (CH)

(73) Assignee: Bobst S.A. (CH)

(*) Notice: Subject to any disclaimer, the term of this patent is extended or adjusted under 35 U.S.C. 154(b) by 165 days.

(21) Appl. No.: 11/292,657

(22) Filed: Dec. 2, 2005

(65) Prior Publication Data
US 2006/0163035 A1 Jul. 27, 2006

(30) Foreign Application Priority Data
Dec. 3, 2004 (EP) .................................. 04405750

(51) Int. Cl.
*B65G 47/252* (2006.01)
(52) U.S. Cl. .................. 198/413; 198/394; 198/395; 198/400; 198/411; 198/415
(58) Field of Classification Search ............... 198/394, 198/395, 400, 411–413, 415
See application file for complete search history.

(56) References Cited

U.S. PATENT DOCUMENTS

| | | | | |
|---|---|---|---|---|
| 4,712,277 A * | 12/1987 | Gustavsson | ............... | 19/296 |
| 4,807,739 A | 2/1989 | Wolf et al. | ............... | 198/415 |
| 5,092,447 A * | 3/1992 | Wyman | ............... | 198/374 |
| 5,101,958 A * | 4/1992 | LeMay et al. | ............... | 198/436 |
| 5,113,993 A * | 5/1992 | Okada | ............... | 198/369.4 |
| 5,195,627 A * | 3/1993 | Wyman | ............... | 198/374 |
| 5,282,528 A | 2/1994 | Hudson | ............... | 198/451 |
| 5,400,896 A | 3/1995 | Loomer | ............... | 198/415 |
| 6,164,431 A * | 12/2000 | Morisod | ............... | 198/415 |
| 6,981,581 B2 * | 1/2006 | Salvoni | ............... | 198/436 |

FOREIGN PATENT DOCUMENTS

EP  0 881 173  12/1998

OTHER PUBLICATIONS

International Search Report issued by the European Patent Office on Jun. 29, 2005.

* cited by examiner

*Primary Examiner*—Gene Crawford
*Assistant Examiner*—Leslie A Nicholson, III
(74) *Attorney, Agent, or Firm*—Ostrolenk, Faber, Gerb & Soffen, LLP

(57) ABSTRACT

Method and device for pivoting plate elements travelling on a flat conveyor, the conveyor being provided with two parallel left and right paths, respective driven at different speeds. The paths define between them a separating line on which the plate elements are rotated around an axis by application of each of the two path speeds on a left portion of the plate element and on a right portion of the plate element defined by the separating line. The method involves maintaining the barycenter of each plate element sufficiently close to the separating line to extend the effect of the rotation applied to these plate elements.

10 Claims, 5 Drawing Sheets

METHOD FOR PIVOTING PLATE ELEMENTS AND DEVICE FOR APPLYING SAID METHOD

BACKGROUND OF THE INVENTION

The present invention relates to a method for pivoting plate elements travelling in a machine which processes them and to a device for applying said method, particularly intended for the packaging industry for manufacturing cardboard boxes, for example.

Boxes of this type are made from flat articles or blanks which have been diecut in a previous operation, then folded and glued in a machine commonly called folder-gluer with the aim of obtaining folded boxes which only have to be made up for making good use. Such articles, even partially folded, are called plate elements in the following description according to a generic term.

In order to perform the various operations required for the folding and the gluing of the plate elements, these elements are conveyed within the folder-gluer through various stations by means of roller or belt conveyors.

Depending on the complexity of the boxes to be obtained with this type of machines, it is often necessary to modify the initial orientation of the plate elements by repositioning them. For example, by pivoting these articles on themselves by 90° or 180°, some folding operations of the flaps or edges of the conveyed elements are easier to carry out. Sometimes, due to pivoting the series of processed plate elements by 180°, a second passage in the machine for completing the folding operations can be avoided.

To facilitate such folding operations, U.S. Pat. No. 5,282,528 discloses a conveying device for a so-called double axis folder-gluer, in which two conveyor belts are disposed at right angle to one another. A transfer device is also disposed at the angle of these two conveyors in order to ensure the passage of the plate elements from one conveyor to the other. Since it cannot be operated in a straight line, this system has the drawback of substantially increasing the required space, in comparison with a straight line machine. Moreover, if the plate elements are to be pivoted by 180°, two 90° pivoting systems disposed in succession are needed.

U.S. Pat. No. 4,807,739 proposes to change the orientation of articles with flat contact surfaces by using two conveyor paths disposed side by side, each separately driven at different speeds to cause rotation of the articles which are simultaneously in contact with said two paths. For driving two contact surface portions of a same article at different speeds, it is necessary that the specific mass of said article be sufficient to generate, between each conveyor path and the corresponding surface portion, a friction force able to ensure the drive of each surface portion at a different speed. This is the case when the articles are stacks of sheets, for example. In the case of conveyed articles with low specific mass, hazardous slidings occur and it is impossible to control the pivoting of such elements.

To overcome this drawback, EP 881,173 proposes, for plate elements with low specific mass, a roller conveyor comprising means for changing the orientation of the elements around axes which are perpendicular to the plane of the conveyor. The conveyor is made up of two parallel paths of rollers, mounted above a box in which a suction system is arranged for pressing against the rollers the conveyed elements, which straddle the two paths. Owing to combined facts that the paths are moved at different speeds, that the speeds are adjustable and that the suction increases the friction force of the elements which are simultaneously conveyed on each of these paths, it is possible to change and to control the orientation of the plate elements which travel on this conveyor.

Moreover, one feature of this device is the transverse movement of the chase which bears the two paths with respect to its frame aligned along the longitudinal axis of the machine. The purpose of the movement is to allow relative repositioning of the plate elements on the longitudinal axis before they leave the conveyor. In fact, it has been noted that, depending on their shape, the plate elements are subject to a lateral translation during the pivoting on the conveyor. Consequently, this unexpected translation is taken into account by moving the paths of the conveyor in advance, or the subsequent stations of the machine, of the same amount but in opposite direction.

Although operation is satisfactory for a majority of the processed elements, it has been noted that this roller conveyor doesn't solve a problem which appears when the surface of the conveyed plate elements in contact with the conveyor has an appreciable length/width ratio or is extremely asymmetrical with respect to the longitudinal axis of the machine. Such an asymmetry can be noted, e.g. on some beer boxes or other plate elements having on their contact surface with the conveyor a wide opening greatly offset with respect to the dividing line separating the two roller paths, left and right, from the conveyor.

When a plate element with such features arrives on the conveyor, it begins to pivot then rapidly stops its rotation on itself in an unwanted position, not having finished its rotation of 90° or 180°. The plate element then continues to travel on the conveyor, driven at the speed of only one path while sliding on the other path. Since the plate element is not pivoted enough, it inevitably causes a jam at the outlet of the conveyor, in spite of a position corrector, not shown, which is provided before the downstream folding tools of the machine.

SUMMARY OF THE INVENTION

The aim of the present invention is to obviate, at least partly, the difficulties of the above-mentioned solutions, more particularly the difficulties of the last-mentioned solution, so that any kind of plate element, even extremely asymmetrical, can be accurately pivoted in the plane of the conveyor.

To this end, the present invention relates to a method and a device for pivoting plate elements travelling on a flat conveyor which is provided with two parallel left and right paths, driven at different speeds. The paths define between them a separating line on which the plate elements are rotated by application of two respective speeds on a left portion and on a right portion defined by the separating line. The method involves maintaining the barycenter of each plate element sufficiently close to the separating line to extend the effect of the rotation applied to these plate elements.

The main advantage of the present invention lies in the fact that the range of boxes which can be converted in a folder-gluer of this type is no more limited by the exclusion of some types of boxes being particularly shaped. Moreover, in cases where the control of the pivoting and the orientation of some types of boxes was previously limited, the object of the present invention advantageously rejects this limit, ensures the reliability of the control and even increases the production rate without losing control of the orientation of the boxes.

Other features and advantages of the present invention will become apparent from the following description of the invention which refers to the accompanying drawings.

BRIEF DESCRIPTION OF THE DRAWINGS

The invention will be more clearly understood from a preferred embodiment given by way of non-limitative example and illustrated by the accompanying drawings, in which.

DESCRIPTION OF A PRIOR ART EMBODIMENT

Figure 1:
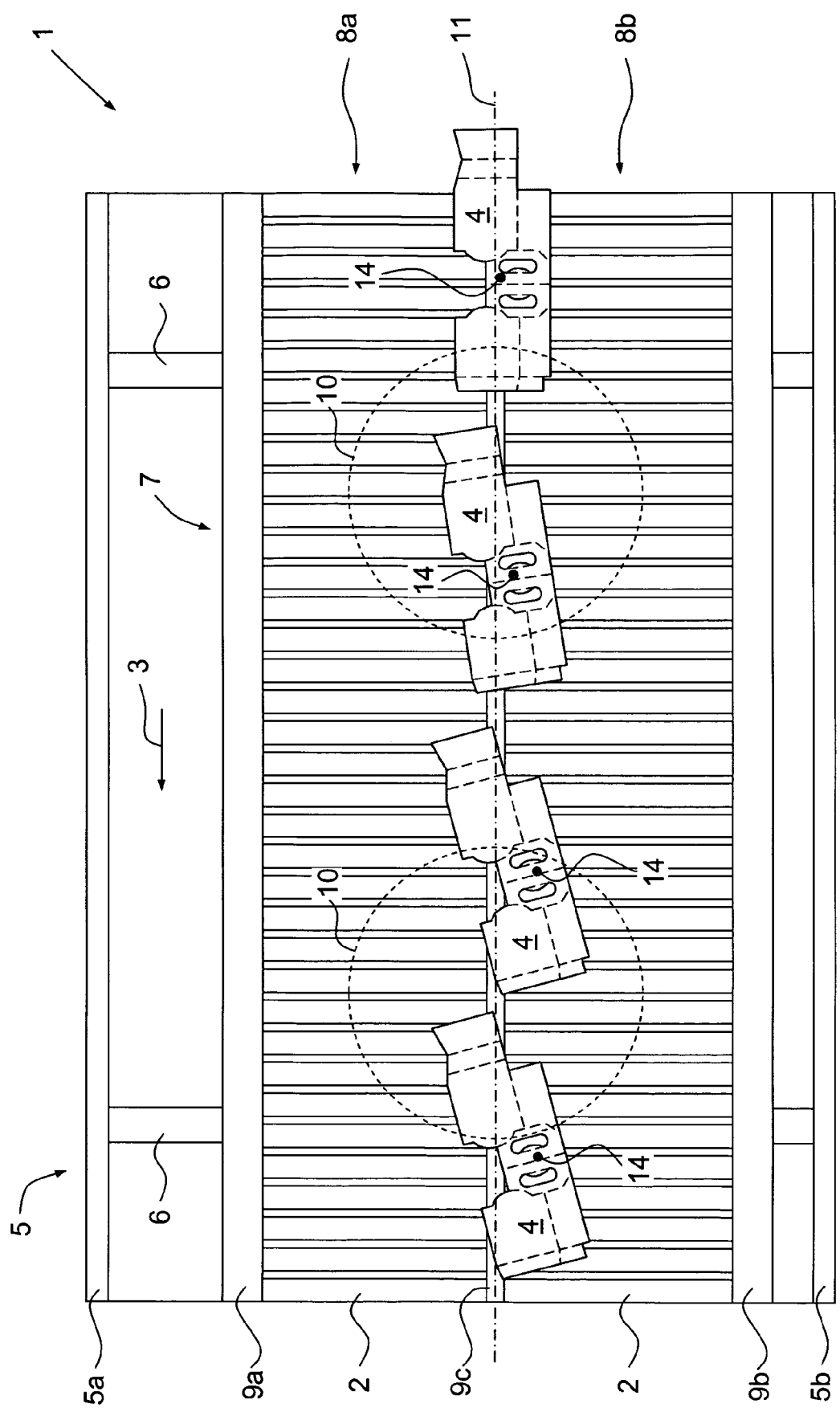
FIG. 1 is a plan view showing a prior art device.

FIG. 1 is a plan view of a conveyor 1 with rollers 2, as known from prior art, for turning and conveying, in the direction of arrow 3, plate elements 4 with low specific mass. The conveyor device comprises a frame 5 made up by parallel vertical right wall 5a and left wall 5b.

Note that the terms right and left are related to the travelling direction 3 of the plate elements. The same applies for the terms upstream and downstream and respectively refer to the input and the output of the conveyor device.

The vertical walls 5a, 5b hold between them guide means comprised of two distance pieces 6 on which a chase 7 can slide transversely to the travelling direction of the plate elements. The chase 7 carries two parallel paths of rollers 2, i.e. a right path 8a and a left path 8b, respectively held between a right guide 9a and a central guide 9c, and between the central guide 9c and a left guide 9b. The rollers 2 of each of the two paths 8a, 8b are driven at respective different speeds by means of two independent respective drive mechanisms, not shown here to avoid overloading the drawing.

Suction means 10, such as reversely rotating fans, are disposed below the plane of the rollers 2 for improving the adherence of plate elements with low specific mass by increasing the friction of the elements on the rollers.

The right and left paths define between them a separating line 11, shown by a dot-and-dash line, which is obligatorily straddled by the plate elements for pivoting them.

Figure 2:
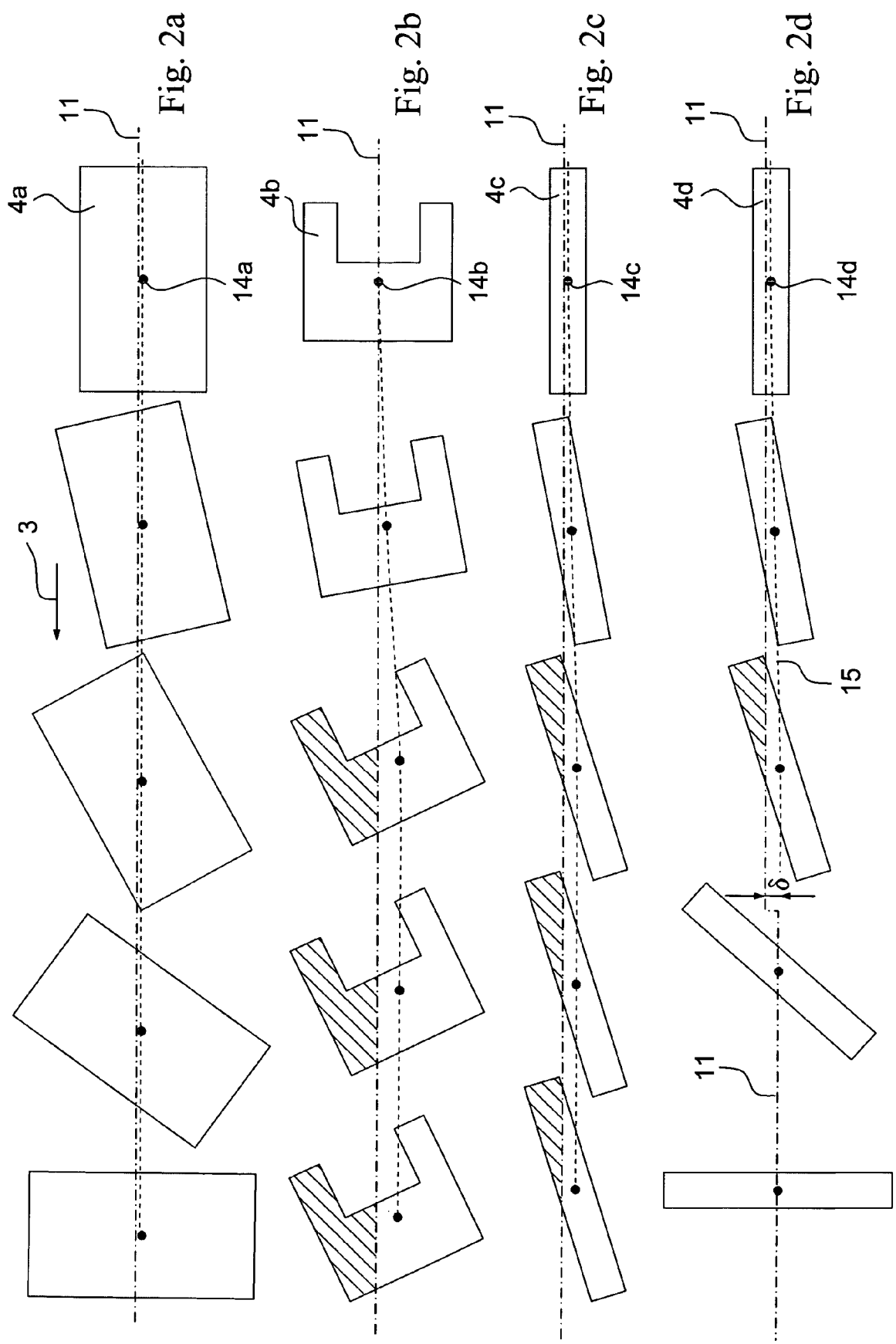
FIGS. 2a, 2b and 2c are diagrams which are helpful for understanding of the problems encountered in prior art.
FIG. 2d is a diagram showing the solution to these problems provided by the present invention.

For a better understanding of the effect of both the application of the suction means 10 and the speed difference of the two paths 8a, 8b on the conveyed plate elements 4, reference is made now to FIGS. 2a, 2b and 2c. These figures respectively schematically show the travelling of three plate elements 4a, 4b, 4c being differently shaped and more precisely the relative positions of the surfaces of these elements in contact with the plane of the conveyor with respect to the separating line 11 of the two paths 8a, 8b.

The center of mass or balance point of each plate element 4a, 4b, 4c is shown by the barycenters 14a, 14b, and 14c, respectively. If a plate element, half-folded, were perfectly symmetrical and homogeneous, the barycenter would correspond to the gravity center of the illustrated surface. FIGS. 2a, 2b, 2c are aimed to simplify the understanding of the problems encountered in prior art with the use of a device such as illustrated in FIG. 1.

The first examined case is in FIG. 2a showing the travelling of a first plate element 4a, being ordinary shaped and substantially symmetrical with respect to the longitudinal axis of the machine shown by the separating line 11. The plate element 4a transits, in the direction of arrow 3, on the plane of the conveyor device, and makes a counterclockwise rotation of 90°. The direction of this rotation thus indicates that the rollers 2 of the right path 8a turn faster than those of the left path 8b, as shown in FIG. 1. Although the barycenter 14a of said element is not exactly disposed on the separating line 11 of the paths 8a, 8b, the surface portions engaged with each of these paths are large enough and equal so that the rotation can be executed accurately.

It has been noted however that certain boxes, being somewhat asymmetrical, suddenly stop turning before completion of their rotation. This particular situation is diagrammatically shown in FIG. 2b, by the illustration of the transition of a plate element 4b presenting such an asymmetry.

Note that the plate element 4b, which at the starting point is disposed in a more favorable position than that shown in FIG. 2a, logically begins a rotation for the same reasons as previously stated. However, due to that rotation, the surface portion in contact with the right path shortens gradually relative to that surface portion in contact with the left path which increases. The resultant of the suction forces, which presses the element against the rollers of the conveyor, is thus greater on the left than on the right. Therefore, the barycenter 14b of the plate elements 4b moves from its initial position toward the left path.

When the rotation of the plate element 4b continues, at one moment the hatched surface portion in contact with the right path becomes too small with respect to the surface portion in contact with the left conveyor. The resultant of the suction forces applied to this last portion is thus too significant with respect to that of the opposite portion. The plate element is thus driven only by one of the two paths, in this example by the left path, ignoring the right path. The surface portion on the right of the plate element therefore just slides on the right path, thus eliminating any possible rotation.

Numerous parameters influence this phenomenon and render any prediction of the place or exact moment where or when the effect of the rotation will be stopped almost impossible. Among these parameters are the shape of the half-folded plate element, the material used (corrugated board, solid board, synthetic material, etc.), the roughness of this material or the relative adherence between this material and the surface of the rollers, the intensity of the suction force, the speed difference of the two paths as well as the inertia of the plate element when arriving in the pivoting device. Moreover, add to this list the spring effect of the edges of the plate element which have already been folded and which, when they are folded by holding means, such as support racks or bars generally located above the plane of the conveyor, tend to bulge the surface of the plate element like to remove it from the rollers. The friction of the folded parts of the plate element on the holding means is also part of these parameters, as the presence and the position of any possible embossed parts in the surface of the plate element in contact with the conveyor, and of course the positioning of this element with respect to the separating line 11, at the inlet of the pivoting device.

Apart from the plate elements which are somewhat asymmetric, the same problem has been noted with plate elements 4c having a considerable ratio length/width, such as diagrammatically shown in FIG. 2c. Although the plate element is in principle not asymmetric, when the barycenter 14c of such an element is not exactly aligned on the separating line 11 at the inlet of the device, an increasing imbalance of the surface portions in contact with each path arises. On this figure, it can also be noted that the hatched portion is smaller than the portion in contact with the left conveyor, thus killing the effect of the rotation applied to the plate element for the same reasons as previously stated.

Description of Preferred Embodiments

The principle of the solution to this problem proposed by the present invention is diagrammatically shown in FIG. 2d. This figure shows a plate element 4d, which is identical to the plate element 4c and positioned in the same manner as in FIG. 2c. Thus, note that the initial conditions are also exactly the same. Consequently, at the beginning of the rotation is also noted that the barycenter 14d moves away from the separating line 11 and follows a dashed imaginary line 15. This moving away continues until the plate element 14d stops pivoting. Then, FIG. 2d shows an abrupt change in the separating line 11 which suddenly approaches a value δ until it is aligned, in this example, on the imaginary line 15 left by the trace of the barycenter 14d. From the very first moment of this approach, the balance between the two surface portions, each in contact with one of the paths 8a, 8b is restored, and the forces applied to the right and to the left surface portions are balanced stabilized and the pivoting of the box can be retaken upon completion.

A pivoting method is suggested from this solution, which comprises maintaining the barycenter 14 of each plate element 4 sufficiently close to the separating line 11 so as to extend the effect of rotation applied to these plate elements, thus allowing completion of the expected rotation. It is understood that contrary to what FIG. 2d presents, it is not necessary to wait the stop of this effect for approaching the separating line 11 to the barycenter of the plate element. Advantageously, a continuous pivoting of the plate element allows to reduce the useable length of the pivoting device.

It is also understood that the maximum efficiency of this effect of rotation is obtained when the barycenter of the plate element accurately follows the separating line of the right path 8a and the left path 8b. Since this fact is hardly applied in any case, it is preferred to choose a solution consisting in proceeding to at least one approaching of the barycenter 14 with the separating line 11.

Being relative, this approaching can be obtained either by moving the separating line of the paths towards the barycenter of the plate element, or by the moving of the plate element towards the separating line of the paths.

Owing to the fact that the notion of the barycenter brings in the distribution of the masses of the plate element as well as the forces applied to this element, the approaching can also be carried out by application of an additional force on the left and/or right surface portion of the plate element.

Obviously, a combination of the various solutions is also possible in order to obtain the relative approaching of the barycenter with the separating line of the paths.

It is thus understood that, considering the whole of the interactions created by all the parameters which influence the behavior of the plate element, it is impossible to determine in advance and with accuracy neither the place nor the moment where or when the plate element will start and/or stop pivoting, nor its real speed of rotation. Thus, in practice, the experience and the skill acquired in this field by the machine operator would be helpful to determine the most suitable correction. This correction depends on variable quantities, i.e. the value δ of the offset, the speeds of the two paths, the suction forces applied to the plate elements as well as the place and the moment of the application of said three first quantities on these elements.

Hereafter, for applying the method of the present invention, a device for pivoting plate elements is also suggested comprising a flat conveyor, similar to the conveying device 1, equipped with additional specific means which will be described hereafter and which can successively move the barycenter of each plate element towards the separating line 11 of the paths 8a, 8b.

Figure 3:
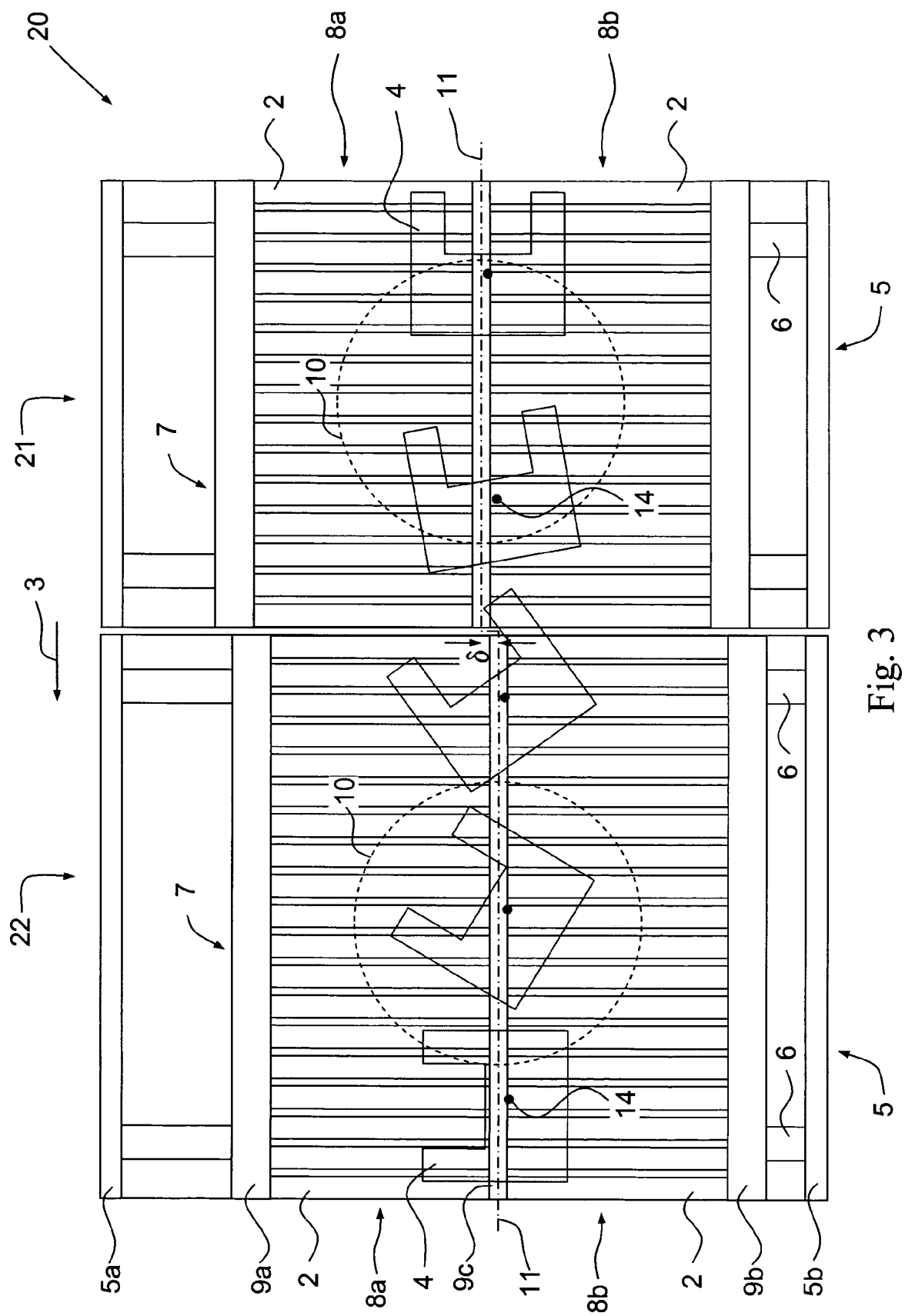
FIG. 3 is a diagrammatic plan view of a device for pivoting plate elements according to the present invention.

FIG. 3 shows a device 20 for pivoting plate elements performing at least one moving of the separating line 11 of the paths 8a, 8b in order to approach the barycenters of the plate elements, transiting on the device, to the separating line 11.

To this end, the pivoting device 20 of plate elements 4 comprises a first flat conveyor 21, similar to the previously described conveying device 1, and additional means comprising at least one second conveyor 22. According to the preferred embodiment, the second conveyor 22 is similar to the first conveyor 21. The second conveyor 22 is joined to and disposed downstream from the first conveyor 21 so that the separating lines 11 of the two adjacent successive conveyors 21, 22 are laterally offset from one another.

This device makes it possible to laterally position each conveyor 21, 22 in a completely independent manner by creating between them an offset of a value δ between their respective separating lines 11.

In a variant, it is obvious that a pivoting device 20 can also be arranged in a single frame 5. The frame supports at least two pairs of distance pieces 6 on which at least two successive chases 7 can slide in a transverse direction with respect to the travelling directions 3 of the plate elements.

As clearly shown in FIG. 3, each conveyor 21, 22 is provided with suction means 10. The suction means exert a force on the conveyed plate elements 4, which force is preferably of the same intensity. However, the suction means 10 of the two adjacent conveyors 21, 22 can also exert different forces successively or simultaneously on the same plate elements. This additional action means increases the possibilities of action on the plate elements for moving their barycenters 14 with respect to the separating line of the paths 8a, 8b in order to approach the barycenter 14 to the separating line.

Figure 4:
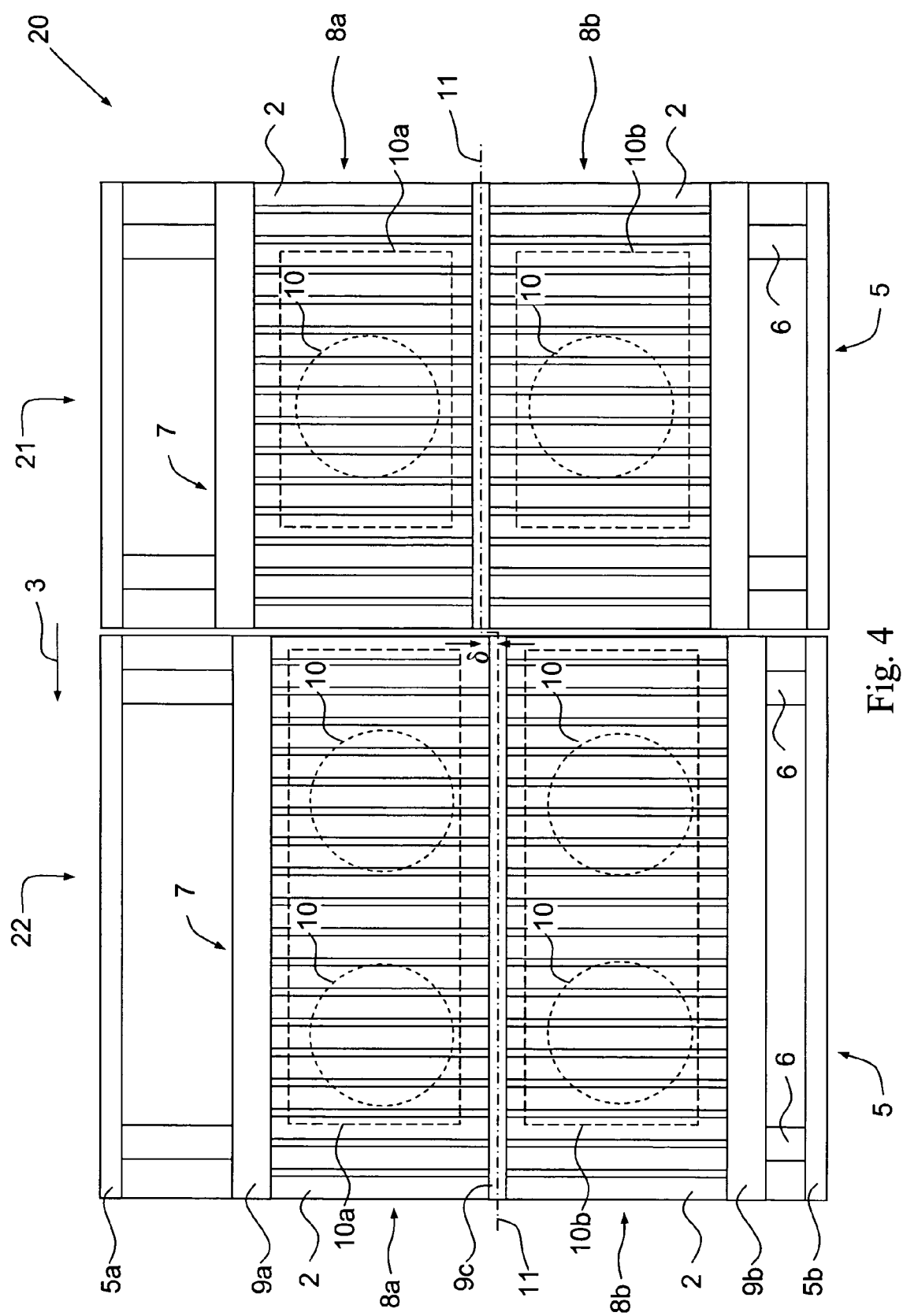
FIG. 4 is a diagrammatic plan view of a first variant of the present invention.

FIG. 4 illustrates, in a first variant, another embodiment of the pivoting device 20, wherein the suction means 10 of each conveyor 21, 22 have been divided in at least two groups 10a, 10b so as to act, simultaneously on a same plate element, in independent and different manners between the right and left paths. The conveyors 21, 22 are preferably all or partly equipped with such suction means. Advantageously, in this variant the barycenter of each plate element is successively moved with respect to the separating line 11 without necessarily acting on the lateral moving of the conveyors for varying the value δ of the offset between their respective separating lines. Still advantageously, it is also possible to influence the position of the barycenter of each plate element by conjointly acting on the setting of the value δ of the offset and on the setting of the difference of the suction forces between the right and left paths, via the groups 10a, 10b.

Figure 5:
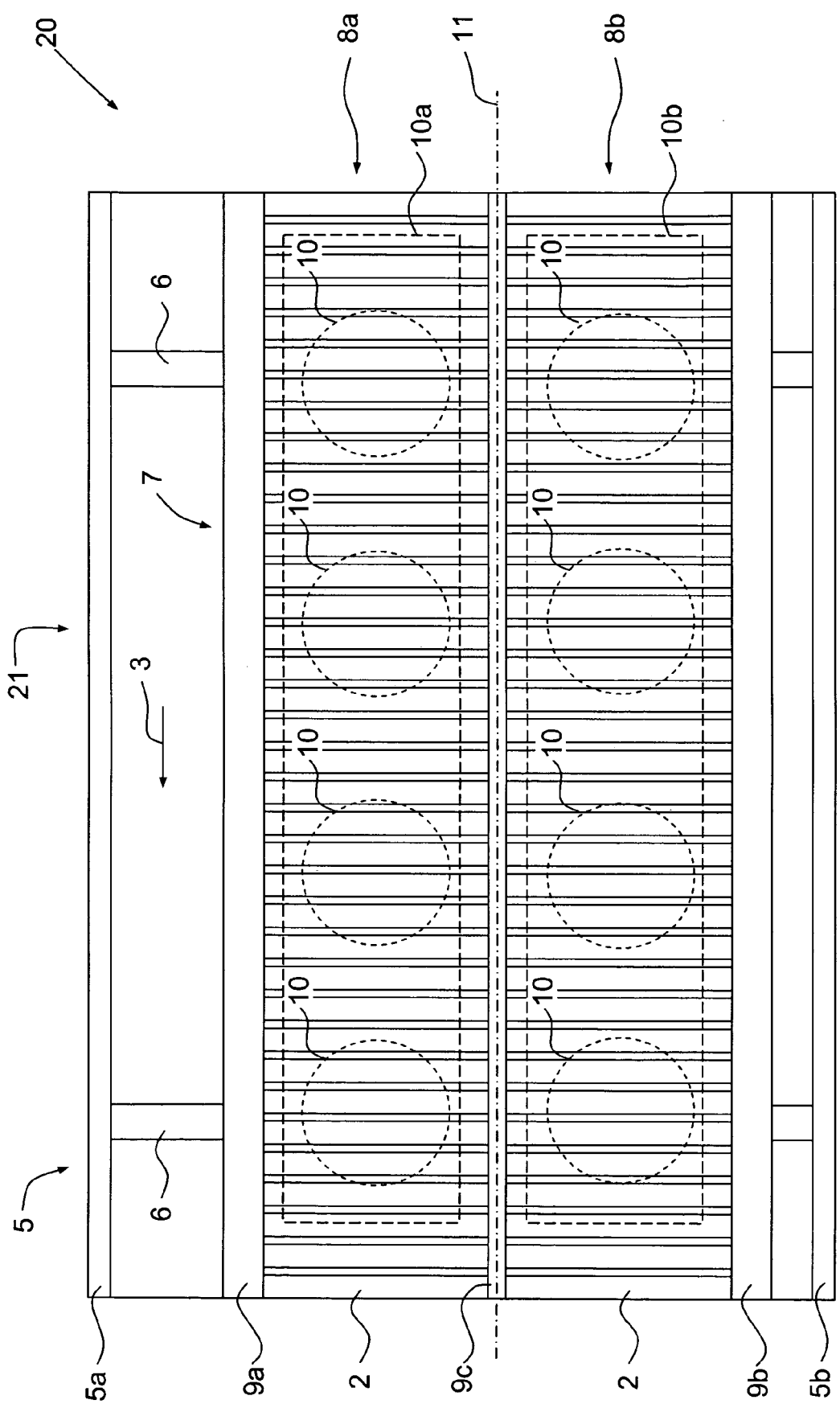
FIG. 5 is a diagrammatic plan view of a second variant of the present invention.

FIG. 5 shows a second variant of the pivoting device 20 wherein the additional means, which can successively move the barycenter of each plate element towards the separating line 11, only comprise suction means 10 arranged under the paths 8a, 8b in a distinct and separate manner. The body of the pivoting device 20 comprises a single conveyor 21 similar to the conveying device 1 shown in FIG. 1.

According to FIG. 5 a plurality of suction means 10 are disposed one after the other under each path 8a, 8b in at least two groups 10a, 10b. The suction means 10 of the first group 10a are arranged under the right path 8a and can exert a suction force which is independent from that generated by the suction means of the second group 10b arranged under the left path 8b. Preferably, each suction means 10 of each group can be independently controlled so that the suction force can be varied along each path 8a, 8b.

In order to improve the differential effect of the suction generated by each path, a physical separation between these two paths is also possible, under the rollers 2, along the separating line 11 for example. Such a physical separation can be realized by means of a wall or two distinct boxes, each arranged under one path 8a, 8b.

The embodiment of the second variant makes it possible to increase, under one path, the force exerted on the plate elements at a given place, along the conveyor 21. Thus, for example, by increasing the suction force of the two downstream suction means 10 of the right path 8a with respect to those of the opposite path, a moving of the barycenters of the plate elements located in this area, straddling the separating line 11, is created. Referring to the illustrations given in FIGS. 2b and 2c, the respective barycenters of these plate elements 4b, 4c move until they approach the separating line 11, thus allowing completion of the rotation of each element in a similar manner to that shown in FIG. 2d.

According to the illustration in FIG. 5, the pivoting device 20 comprises only one conveyor 21 on which the suction means 10 have been added so that they can exert, simultaneously on a same plate element, different forces between the right path 8a and the left path 8b.

Finally, even if it is technically more difficult to realize, the possibility of another variant is further mentioned, wherein the additional means comprise at least one alternating moving member which is adjustable laterally, longitudinally and angularly above the plane of the conveyor 21. Such a moving member may comprise a pusher stop or a pull rod actuated in an alternating reciprocating movement by an actuator controlled by the travelling speed of the plate elements. Such a moving member enables the plate elements to be translated locally and punctually, one by one, during their travel on the conveyor 21, towards the separating line 11 of the paths 8a, 8b without varying the angle of their position with respect to that line. It will be understood that this additional variant, which is technically less efficient than the preceding ones due to the reciprocating movement required by this member, can nevertheless be a conceivable solution in the case where the plate elements are travelling only at low speed and they present a blank having a relative simple shape.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A device for pivoting plate elements, comprising:
a first conveyor including parallel left and right roller paths of rollers, the roller paths being separated by a separating line, and the rollers of each path being oriented and guided to move in a direction parallel to the separating line, the first conveyor further comprising a respective drive with adjustable speed for each of the roller paths, each respective drive being operable for moving the paths at different speeds, the first conveyor being operable to rotate the plate elements placed thereon;
a suction apparatus positioned at the first conveyor, the suction apparatus including a first suction device positioned under the left roller path, the suction apparatus further including a second suction device positioned under the right roller path, the first and second suction devices being independent and physically separated from one another, the first and second suction devices being operable for simultaneously exerting on a same plate element different suction forces between the left path and the right path, the forces being directed downwardly towards and perpendicular to a plane of the first conveyor;
a frame supporting the first conveyor, the frame having guides shaped, positioned and operable to allow to move the first conveyor in a direction lateral to the separating line;
additional elements comprising at least one second conveyor located downstream of the first conveyor along a direction of conveying the plate elements, the second conveyor also having second left and right roller paths and a separating line between the second left and right roller paths, the second conveyor being operable to rotate the plate elements placed thereon and to move a barycenter of each plate element towards the separating line of the second conveyor;
the second conveyor being joined to the first conveyor and being disposed so that the separating lines of the first conveyor and the second conveyor are laterally offset from one another.

2. A device according to claim 1, further comprising a second suction apparatus positioned at the second conveyor, each suction apparatus being operable to exert respective different forces on the same plate element as the plate element passes by the suction apparatus and the second suction apparatus.

3. A device according to claim 2, wherein the second suction apparatus includes a third suction device positioned under the second left roller path and includes a fourth suction device positioned under the second right roller path, the third and fourth suction devices being independent and physically separated from one another, the first and second suction devices, being operable for simultaneously exerting, on a same plate element, different forces between the second right path and the second left path of the second conveyor.

4. A device according to claim 1, wherein the additional elements comprise at least one alternating moving member, which is adjustable laterally, longitudinally and angularly above a plane of the conveyor and which is operable to locally translate the plate elements in the direction of the separating line of the paths.

5. A device according to claim 1, wherein the separating lines of the first conveyor and the second conveyor are parallel.

6. A device according to claim 1, wherein the first conveyor is a flat conveyor.

7. A device according to claim 1, further comprising a plurality of the first suction devices arranged in a first group and comprising a plurality of the second suction devices arranged in a second group, the first and second group being independent and physically separated from one another.

8. A device for pivoting plate elements, comprising
a conveyor including parallel left and right roller paths of rollers, the roller paths being separated by a separating line, and the rollers of each path being oriented and guided to move in a direction parallel to the separating line, the conveyor further comprising a respective drive with adjustable speed for each of the roller paths, each respective drive and the drives being operable for moving the paths at different speeds, the conveyor being operable to rotate the plate elements placed thereon;

a suction apparatus positioned at the conveyor, the suction apparatus including a first suction device positioned under the left roller path, the suction apparatus further including a second suction device positioned under the right roller path, the first and second suction devices being independent and physically separated from one another, the first and second suction devices being operable for simultaneously exerting on a same plate element different suction forces between the left path and the right path, the forces being directed downwardly towards and perpendicular to a plane of the conveyor;

a frame supporting the conveyor, the frame having guides shaped, positioned and operable to move the conveyor in a direction lateral with respect to the separating line;

additional elements operable for moving a barycenter of each plate element towards the separating line of the paths, the additional elements comprising the suction apparatus being distributed beneath each of the right path and left path in at least two independent groups, the suction apparatus being operable for simultaneously exerting different forces on a same plate element situated on the right path and the left path by the independent groups of the suction apparatus beneath the right path and left path respectively.

9. A device according to claim 8, wherein the additional elements comprise at least one alternating moving member, which is adjustable laterally, longitudinally and angularly above a plane of the conveyor and which is operable to locally translate the plate elements in the direction of the separating line of the paths.

10. A device according to claim 8, further comprising a plurality of the first suction devices arranged in a first group and comprising a plurality of the second suction devices arranged in a second group, the first and second group being independent and physically separated from one another.

* * * * *